US011338708B2

(12) United States Patent
Sulaiman et al.

(10) Patent No.: US 11,338,708 B2
(45) Date of Patent: May 24, 2022

(54) SEAT HEIGHT ADJUSTMENT DEVICE FOR A VEHICLE SEAT

(71) Applicant: Faurecia Autositze GmbH, Stadthagen (DE)

(72) Inventors: Hosen Sulaiman, Dortmund (DE); Heinz-Werner Dettmer, Nordsehl (DE); Markus Schenke, Petershagen (DE); Jens Witt, Nienstädt (DE)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 17/018,445

(22) Filed: Sep. 11, 2020

(65) Prior Publication Data

US 2021/0078457 A1    Mar. 18, 2021

(30) Foreign Application Priority Data

Sep. 13, 2019   (DE) .......................... 102019124703.9

(51) Int. Cl.
*B60N 2/16*    (2006.01)
*B21K 1/30*    (2006.01)

(52) U.S. Cl.
CPC ................ *B60N 2/165* (2013.01); *B21K 1/30* (2013.01)

(58) Field of Classification Search
CPC ..................................................... B60N 2/165
See application file for complete search history.

(56) References Cited

U.S. PATENT DOCUMENTS

| 6,045,186 A * | 4/2000 | Butt ..................... B60N 2/4221 297/216.1 |
| 2012/0248840 A1* | 10/2012 | Becker ................ B60N 2/1675 297/344.1 |
| 2013/0040161 A1 | 2/2013 | Gerlach |
| 2017/0057388 A1* | 3/2017 | Vikstrom ............... B60N 2/067 |
| 2018/0009338 A1* | 1/2018 | Kim ...................... B60N 2/1615 |
| 2020/0262320 A1* | 8/2020 | Behrens .................. B60N 2/68 |

FOREIGN PATENT DOCUMENTS

| DE | 102010009345 B4 | 8/2011 | |
| DE | 102011001638 A1 | 10/2012 | |
| DE | 102011100735 A1 * | 11/2012 | ........... B60N 2/2213 |
| DE | 202014104538 U1 | 11/2014 | |
| DE | 102014004863 A1 * | 10/2015 | ........... B60N 2/0228 |
| KR | 20090025600 A * | 3/2009 | |
| WO | WO-2013072055 A1 * | 5/2013 | ............... B60N 2/68 |
| WO | WO-2017018491 A1 * | 2/2017 | ............. B21D 53/88 |

* cited by examiner

*Primary Examiner* — Timothy J Brindley
(74) *Attorney, Agent, or Firm* — Barnes & Thornburg LLP

(57) ABSTRACT

The present disclosure relates to a seat height adjustment device for adjusting the height of a seat cushion in relation to a seat frame, in particular, an upper rail, the seat height adjustment device comprising an actuating device, which may be, in particular, an electric motor, with a toothed pinion driven by the actuating device, and a toothed gear rack, the toothed gear rack comprising a hinge end for hinging onto the vehicle seat, and a front end including a gear rod region engaging with the toothed pinion, for adjusting the hinge end upon rotation of the toothed pinion. The present disclosure provides that the toothed gear rack is hot forged, the toothed gear rack comprises, between the hinge end and the gear rod region, a reinforced region, and the reinforced region comprises a profile.

17 Claims, 3 Drawing Sheets

SEAT HEIGHT ADJUSTMENT DEVICE FOR A VEHICLE SEAT

PRIORITY CLAIM

This application claims to German Patent Application No. DE 10 2019 124 703.9, filed Sep. 13, 2019, which is expressly incorporated by reference herein.

BACKGROUND

The present disclosure relates a seat height adjustment device for a vehicle seat, a corresponding vehicle seat, as well as a method for manufacturing a toothed gear rack for a seat height adjustment device.

SUMMARY

According to the present disclosure, a seat height adjustment device for a vehicle seat allows the absorption of high forces and the adaptation to suitable seat geometries.

In illustrative embodiments, a vehicle seat including such a seat height adjustment device is provided, as well as a method for manufacturing the toothed gear rack of the seat height adjustment device.

In illustrative embodiments, the toothed gear rack, which is driven by the drive pinion or toothed pinion respectively via its gear rod region formed at the front end and hinged to, for example, a structural component of the seat frame, e.g. an upper rail, at its hinge end, is preferably designed as a one-piece, hot forged component, where a region reinforced by a profile is formed between the hinge end and the gear rack region. Thus, this reinforced, profiled region can be formed by hot forging to a shape that exhibits the required stiffness. Hereby, e.g. an H shape, a Z shape, a U shape, or even a T shape may be formed, allowing for, in particular, increased bending resistance.

In illustrative embodiments, the central, reinforced, profiled region of the toothed gear rack may form a bent or curved shape between the toothed region and the hinge end, like it is provided or required based on the respective geometry or, respectively, the position of the joint connection and the attachment of the actuating device, i.e., in particular, of the electric motor, and still be made with relatively low cost of materials and a high degree of stiffness.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
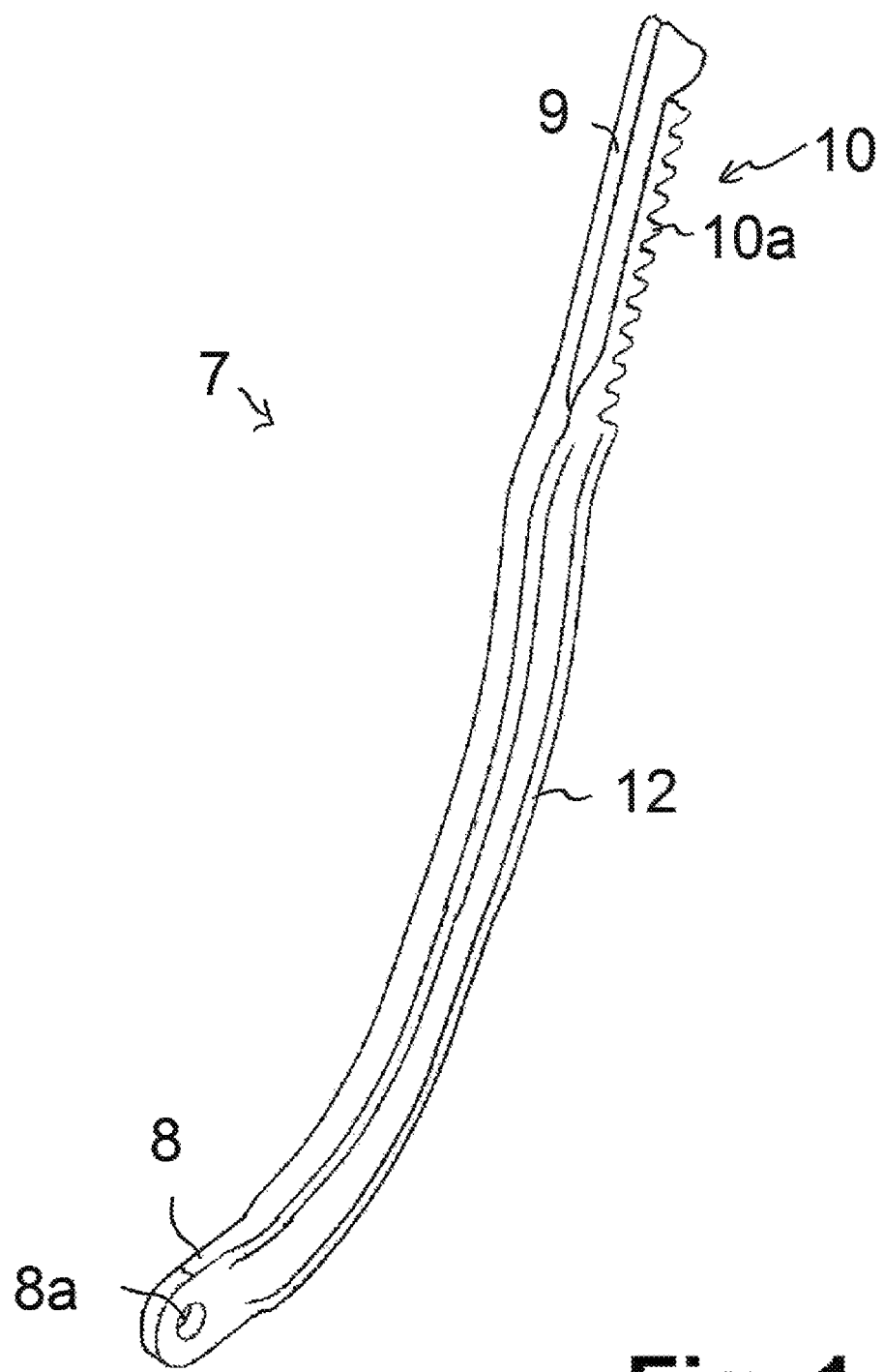
FIG. 1 is a toothed gear rack according to one embodiment of the present disclosure.
Figure 2:
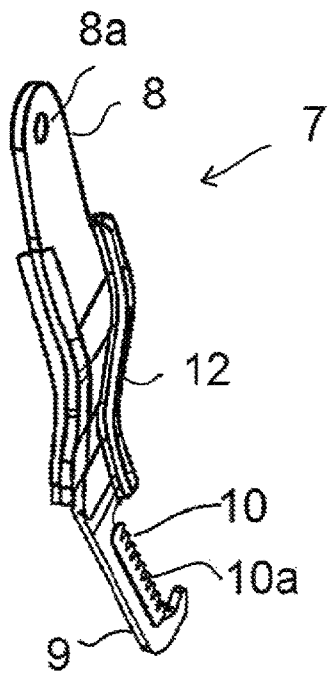
FIG. 2A shows a further toothed gear rack according to one embodiment.
FIG. 2B shows a further toothed gear rack according to one embodiment.
FIG. 2C shows a further toothed gear rack according to one embodiment.
FIG. 2D shows a further toothed gear rack according to one embodiment.
Figure 2:
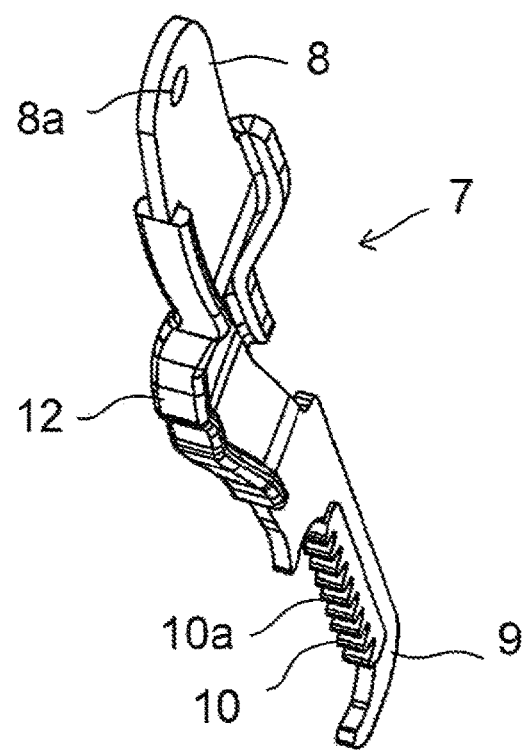
Figure 2:
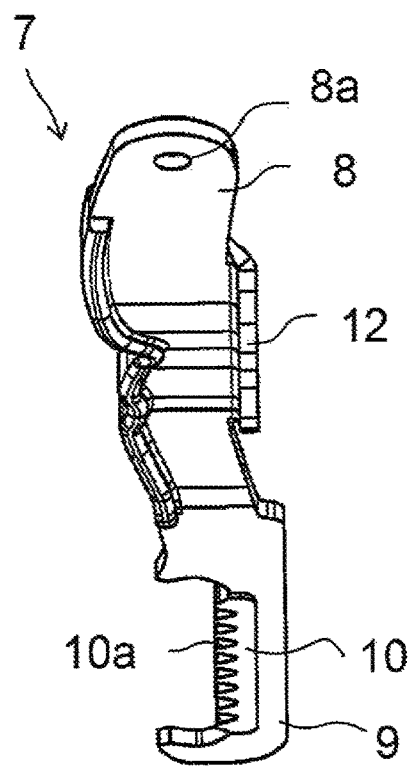
Figure 2:
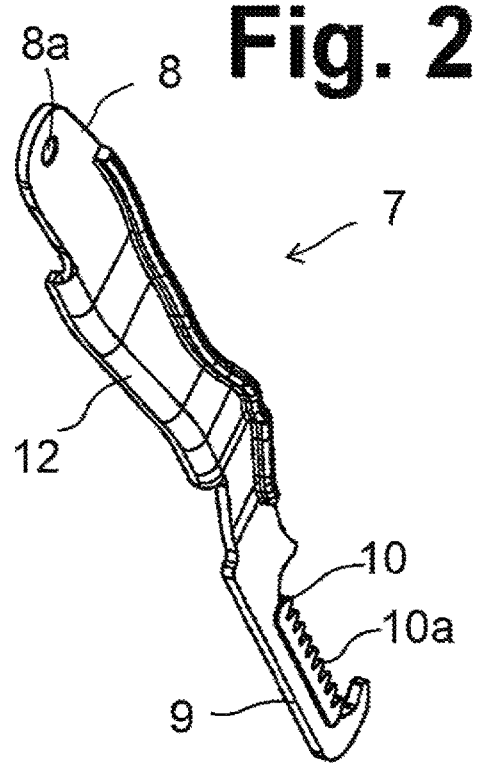
Figure 3:
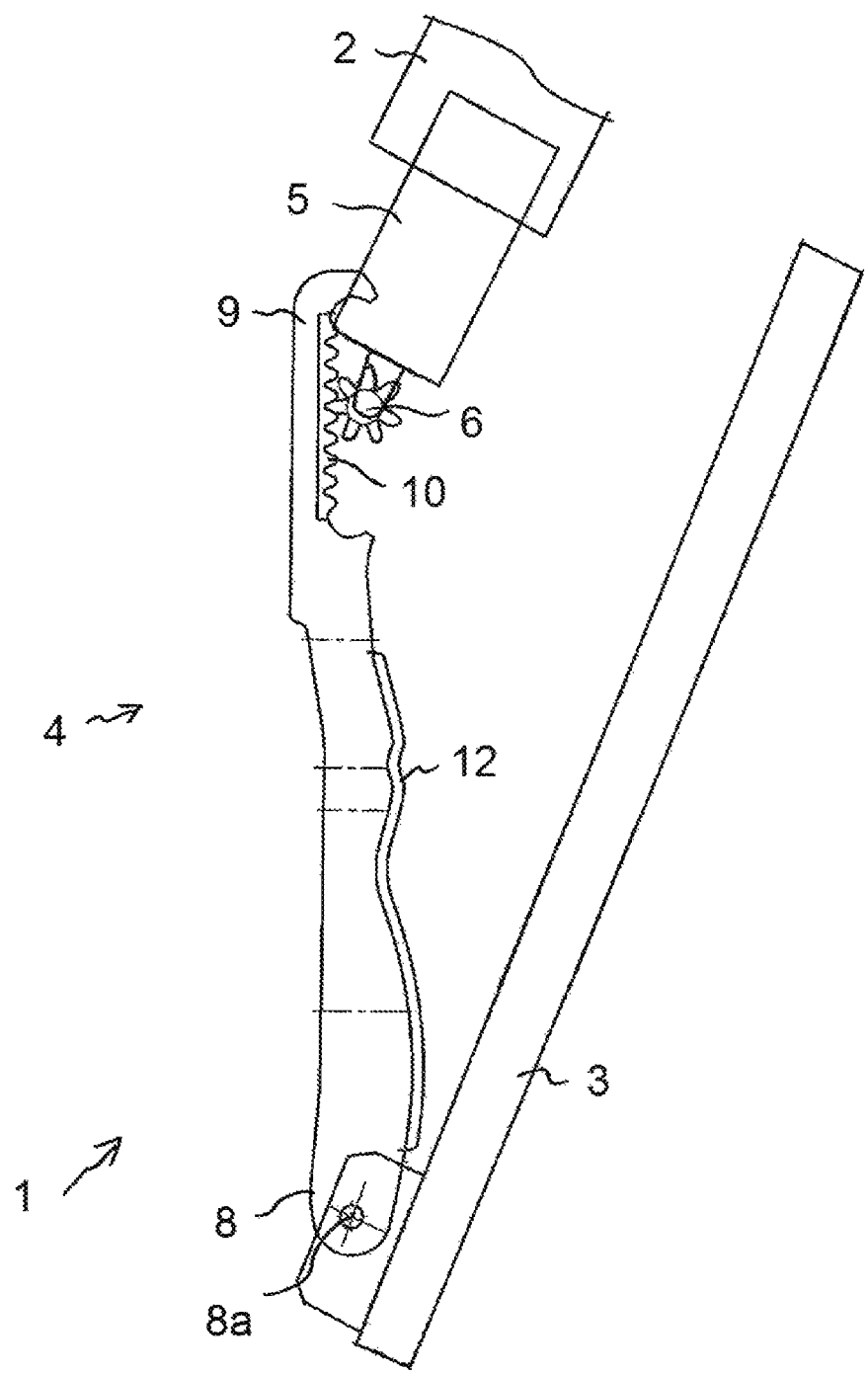
FIG. 3 is a vehicle seat including a seat height adjustment device according to one embodiment, with its elements relevant here.

A vehicle seat 1, shown schematically in FIG. 3, here comprises a seat cushion 2, indicated schematically as a structural component, which can be height adjusted in relation to a seat frame with upper rails 3 by means of a seat height adjustment device 4. For that purpose, the seat height adjustment device 4 comprises an electric motor 5 as actuating device which is attached to the seat cushion 2 and drives a toothed pinion 6 via its output shaft. A toothed gear rack 7 is hinged, via its hinge end 8, e.g. onto an upper rail 3 or a structural component connected to the upper rail 3, with a gear rod region 10 being formed at its other end, designated here as the front end 9, the gear rod region engaging with the toothed pinion 6 thereby being adjusted upon rotation of the toothed pinion 6 by the electric motor 5. Thus, actuating the electric motor 5 adjusts the toothed gear rack 7 in its longitudinal direction thereby in turn adjusting the seat cushion 2, in particular for the purpose of height adjustment of the seat cushion 2.

The hinge end 8 of the toothed gear rack 7 is designed flat and comprises a bearing eye 8a; this is followed by a central, reinforced region 12 which merged into the gear rod region 10 of the front end 9. The gear rod region 10 exhibits several teeth 10a at its underside. The toothed gear rack 7 is bent slightly from its hinge end 8 towards the gear rod region 10; the exact shape of the central region 12 will depend, in particular, on the geometry at the point of use, i.e. in the vehicle seat 1.

FIGS. 2A, 2B, 2C, and 2D show further embodiments of such toothed gear racks 7, each comprising a hinge end 8 with a bearing eye 8a and a gear rod region 10 at their other end 9, between which there is always provided a reinforced region 12 as central region which may have differing profiles depending on the load.

The toothed gear rack 7 is designed as a one-piece hot forged component. In order to product it a blank sheet part is processed as described below; hereby, the blank sheet part may be formed e.g. directly from a coil, i.e. a band is cut off from a coil and processed in individual procedure steps:

The reinforced region 12 is formed by hot forging, i.e. reshaping in a hot or, respectively, heated state. Hereby, the shape or, respectively, profile is formed, e.g. with the embodiments indicated in FIGS. 2A-2D as an H profile (FIGS. 2A and 2B), U profile (FIG. 2C), Z profile (FIG. 2D), or T profile. Thus, a significant reinforcement can be formed by this profile alone made during hot forging.

For forming the gear rod regions 10 or, respectively, the row of teeth the front end 9 is preferably heated and subsequently, in this state, cut to its final shape in a punching tool. Hereby, the front end 9 cools off correspondingly quickly so that it is tempered thereby, i.e. advantageously with forming of martensite. Alternatively, the gear rod region 10 may be pre-cut to a raw contour and heated thereafter, and, in in this state, the component brought to its final contours in a stamping tool, with corresponding cooling-off or, respectively, quenching of the gear rod region 10.

According to one embodiment, the reinforced region 12 is also tempered by the thermal treatment during hot forging, i.e. in particular by the quick cooling-off after the forging process. Thus, in particular, the entire toothed gear rack, i.e. the toothed region 10, the hinge end 8, and the central region 10, is tempered.

Alternatively, however, it is possible to not temper the central region 12. In that case, preferably, the front end 10 with the gear rod region 10 is tempered, optionally also the hinge end 8, but not the central region 10, which can thereby serve as deformation reserve, in particular in the event of impact deformation.

Thus, as can be seen from the embodiments shown, the profile or, respectively, deformation is limited altogether or essentially to the central, reinforced region 12; advantageously, the hinge end 8 has no profile. The front end 9 with the gear rod region may also be formed without a profile, as can be seen from the figures. By virtue of the teeth 10a formed, hereby, the gear rod region 10 may be designed thicker than the remaining region of the front end 9.

The present disclosure relates to a seat height adjustment device for a vehicle seat, a corresponding vehicle seat, as well as a method for manufacturing a toothed gear rack for die Seat height adjustment device.

Seat height adjustment devices generally an actuating device including a toothed pinion driven by the actuating device, and a toothed gear rack for adjusting a seat cushion. The actuating device may be e.g. an electric motor or even a manual actuating device comprising e.g. hand lever; the actuating device is mounted e.g. on a structural of the seat cushion and drives the toothed pinion which engages with the toothed gear rack.

At one of its ends the toothed gear rack comprises a gear rod region or a row of teeth respectively which engages with the toothed pinion thereby being longitudinally adjusted upon rotation of the toothed pinion, and at its other end a joint formation, e.g. comprising a bearing eye which e.g. is hinged onto the seat cushion. Thus, by longitudinally adjusting the toothed gear rack, it is possible to adjust the seat cushion in relation to the seat frame; thus, the seat cushion is adjusted in height in accordance with the pivoting kinematics, e.g. by means of swinging or coupling.

Consequently, the toothed gear rack is exposed to high stress and constructed as a high precision component, in particular in the gear rod region by engagement of the toothed pinion, but also in its central region which may be designed, depending on the respective geometry at the vehicle seat, e.g. bent or curved thereby being exposed to bending moments.

To that end, a starting component, usually a flat sheet metal part, is usually formed by fine blanking and subsequent tempering by means of thermal treatment. However, the shaping process may general a large interior tension in the finished part which may lead to an uncontrollable deviation of the component from target dimensions after thermal treatment. Moreover, the manufacturing of fine blanking and thermal treatment procedures carried out successively are generally associated with increased efforts, including logistics efforts, thereby increasing the overall cost of manufacturing. Furthermore, the die roll generated in the course of such manufacturing constitutes a disadvantage because it can lead to a loss in load bearing capacity.

A comparative method with a tool for manufacturing a component where a toothed region is formed. Hereby, the aim is to form a wall with consistent thickness.

A comparative adjustment actuator for an adjustment device for adjusting the height of a vehicle seat, whereby the adjustment actuator may be a swing arm hinged on both sides with an interlocking region. The adjustment actuator comprises joint bearings for connecting with two adjustable vehicle seat parts and an interlocking region formed from a tempered material. A coupling region to act as deformation region and to absorb energy is formed between the joint bearings. The interlocking region is tempered by thermal treatment, e.g. laser treatment and/or a chemical treatment such as e.g. nitrification, while the coupling region is formed untempered.

Another comparative method for manufacturing a component from a thin walled semi made of metal, where the component comprises a substrate and a circumferential structure which is formed in several forming processes.

In comparative systems, generally, the shape of the gear rod is established in advance in a first step to be followed by the shaping and forming. To that end, usually, a blank is cut to a suitable shape so as to allow subsequent cold forming.

The present disclosure creates a seat height adjustment device for a vehicle seat allowing the absorption of high forces and the adaptation to suitable seat geometries.

This task is solved by a seat height adjustment device in accordance with the present disclosure. Further, a vehicle seat including such a seat height adjustment device is provided, as well as a method for manufacturing the toothed gear rack of the seat height adjustment device.

Thus, the toothed gear rack, which is driven by the drive pinion or toothed pinion respectively via its gear rod region formed at the front end and hinged to, for example, a structural component of the seat frame, e.g. an upper rail, at its hinge end, is preferably designed as a one-piece, hot forged component, where a region reinforced by a profile is formed between the hinge end and the gear rack region. Thus, this reinforced, profiled region can be formed by hot forging to a shape that exhibits the required stiffness. Hereby, e.g. an H shape, a Z shape, a U shape, or even a T shape may be formed, allowing for, in particular, increased bending resistance.

Thus, the central, reinforced, profiled region of the toothed gear rack may form a bent or curved shape between the toothed region and the hinge end, like it is provided or required based on the respective geometry or, respectively, the position of the joint connection and the attachment of the actuating device, i.e., in particular, of the electric motor, and still be made with relatively low cost of materials and a high degree of stiffness.

According to the present disclosure, in particular, it is not necessary to bend the component in advance by cold forming; generally, such cold forming requires advance trimming to prevent cracking inside the component, so that the bent part is generally formed slimmer or, respectively, with a lower degree of resilience. By means of forming the central, reinforced region by hot forging according to the present disclosure, instead, this region may, for one thing, be bent during the forging procedure and, for another, be formed with the profile so as to increase its bending resistance.

In the context of the present disclosure the term "bent" shall be understood, in particular, as meaning a non-straight course between the front end and the hinge end, i.e., in particular, the central region being bulbous compared to a straight line of connection.

Hereby, the present disclosure recognizes the fact that this hot forging can be combined with a suitable design of the row of teeth or the gear rod region respectively which is formed also by hot forging. Hereby, the initial component may first be cut and subsequently heated at its front end, where the row of teeth or the gear rod region respectively is to be formed, so that it can, while in this state, be shaped into the final contours by a stamping tool, or first be heated and subsequently, in this state, cut finally in a punching tool.

Thus, the entire toothed gear rack can be made as one piece in a few process steps, whereby, in general, a forging process can be carried out along with various work steps in the respective areas.

The reinforced region can, in particular, be tempered, i.e. by means of a suitable thermal treatment or, respectively, quenching, in particular, with forming of martensite.

Alternatively, however, the reinforced region may be purposefully made softer, so as to absorb crash forces, and not tempered to thereby form a deformation reserve. Thus, it may exhibit the suitable profile for absorbing the usual bending forces while being less hard in relation to the gear rod region and serve to absorb the deformation energy in the event of e.g. a rear impact.

Thus, the seat height adjustment device according to the present disclosure can also be designed for various positions in vehicle seats or, respectively, different types of vehicle seats, each with a suitable central bent region of the toothed gear rack which can be reinforced by a profile in a suitable manner.

The following numbered clauses include embodiments that are contemplated and non-limiting:

Clause 1. A seat height adjustment device (4) for adjusting the height of a seat cushion (2) in relation to a seat frame (3), in particular, an upper rail (3),
the seat height adjustment device (4) comprising an actuating device (5) with a toothed pinion (6) driven by the actuating device (5) and a toothed gear rack (7), the toothed gear rack (7) comprising a hinge end (8) for hinging onto the vehicle seat (1), and a front end (9) including a gear rod region (10) engaging with the toothed pinion (6), for adjusting the hinge end (8) upon rotation of the toothed pinion (6),
wherein the toothed gear rack is hot forged, the toothed gear rack (7) comprises, between the hinge end (8) and the gear rod region (10), a reinforced region (12), and the reinforced region (12) comprises a profile.

Clause 2. The seat height adjustment device (4) according to clause 1, wherein the reinforced region (12) is given a profile by reshaping its cross-section, in particular, into an H, a U, a T, or a Z shape.

Clause 3. The seat height adjustment device (4) according to one of the above clauses, wherein the front end (9) is tempered by thermal treatment after or during hot forging, in particular, in the region of the teeth (10a) of the gear rod region (10), preferably with forming of martensite.

Clause 4. The seat height adjustment device (4) according to one of the above clauses, wherein the reinforced region (12) is quenched by thermal treatment after or during hot forging, preferably with forming of martensite.

Clause 5. The seat height adjustment device (4) according to one of the clauses 1 through 3, wherein the reinforced region (12) is made softer in relation to the material of the gear rod region (10), in particular, without quenching and/or without forming of martensite.

Clause 6. The seat height adjustment device (4) according to one of the above clauses, wherein the toothed gear rack (7) is designed as a one-piece, hot forged sheet metal part.

Clause 7. The seat height adjustment device (4) according to one of the above clauses, wherein the central, reinforced region (12) is bent.

Clause 8. The seat height adjustment device (4) according to one of the above clauses, wherein the actuating device (5) is an electric motor (5) or a manual actuating device, e.g. with a hand lever.

Clause 9. A vehicle seat (1), comprising a seat frame (3), a seat cushion (2) height adjustable in relation to the seat frame (3), and a seat height adjustment device (4) according to one of the above clauses.

Clause 10. The vehicle seat (1) according to clause 9, wherein the electric motor (5) is attached to the seat cushion (2), and the hinge end (8) is hinged onto the seat frame (3), preferably to upper rails (3) of the seat frame (3).

Clause 11. A method for manufacturing a toothed gear rack (7) for a seat height adjustment device (4) according to one of the clauses 1 through 8, including at least the following steps:
providing a blank part made of a sheet material,
hot forging the blank part while re-shaping and profiling the central region therefor as a reinforced region (12) and while forming the gear rod region (10) at its front end (9),
wherein the gear rod region (10) is heated and, in this state, is cut to its final shape in a punching tool and cooled off meanwhile.

The invention claimed is:

1. A seat height adjustment device for adjusting the height of a seat cushion in relation to a seat frame, in particular, an upper rail, the seat height adjustment device comprising
an actuating device with a toothed pinion driven by the actuating device and a toothed gear rack,
the toothed gear rack comprising a hinge end for hinging onto the vehicle seat, and a front end including a gear rod region engaging with the toothed pinion, for adjusting the hinge end upon rotation of the toothed pinion,
wherein the toothed gear rack is hot forged, the toothed gear rack comprises, between the hinge end and the gear rod region, a reinforced region, and the reinforced region comprises a profile, and
wherein the front end is tempered by thermal treatment after or during hot forging, in particular, in the region of the teeth of the gear rod region, preferably with forming of martensite.

2. The seat height adjustment device of claim 1, wherein the reinforced region is given a profile by reshaping its cross-section, in particular, into an H, a U, a T, or a Z shape.

3. The seat height adjustment device of claim 1, wherein the toothed gear rack is designed as a one-piece, hot forged sheet metal part.

4. The seat height adjustment device of claim 1, wherein the central, reinforced region is bent.

5. The seat height adjustment device of claim 1, wherein the actuating device is an electric motor or a manual actuating device.

6. A vehicle seat comprising
a seat frame,
a seat cushion which is height adjustable in relation to the seat frame, and
a seat height adjustment device according to claim 1.

7. The vehicle seat of claim 6, wherein an electric motor is attached to the seat cushion, and the hinge end is hinged onto the seat frame, preferably to upper rails of the seat frame.

8. A seat height adjustment device for adjusting the height of a seat cushion in relation to a seat frame, in particular, an upper rail, the seat height adjustment device comprising
an actuating device with a toothed pinion driven by the actuating device and a toothed gear rack,
the toothed gear rack comprising a hinge end for hinging onto the vehicle seat, and a front end including a gear rod region engaging with the toothed pinion, for adjusting the hinge end upon rotation of the toothed pinion, wherein the toothed gear rack is hot forged, the toothed gear rack comprises, between the hinge end and the gear rod region, a reinforced region, and the reinforced region comprises a profile, and wherein the reinforced region is quenched by thermal treatment after or during hot forging, preferably with forming of martensite.

9. The seat height adjustment device of claim 8, wherein the reinforced region is given a profile by reshaping its cross-section, in particular, into an H, a U, a T, or a Z shape.

10. The seat height adjustment device of claim 8, wherein the toothed gear rack is designed as a one-piece, hot forged sheet metal part.

11. The seat height adjustment device of claim 8, wherein the central, reinforced region is bent.

12. The seat height adjustment device of claim 8, wherein the actuating device is an electric motor or a manual actuating device.

13. A seat height adjustment device for adjusting the height of a seat cushion in relation to a seat frame, in particular, an upper rail, the seat height adjustment device comprising an actuating device with a toothed pinion driven by the actuating device and a toothed gear rack, the toothed gear rack comprising a hinge end for hinging onto the vehicle seat, and a front end including a gear rod region engaging with the toothed pinion, for adjusting the hinge end upon rotation of the toothed pinion, wherein the toothed gear rack is hot forged, the toothed gear rack comprises, between the hinge end and the gear rod region, a reinforced region, and the reinforced region comprises a profile, and wherein the reinforced region is made softer in relation to the material of the gear rod region, in particular, without quenching and/or without forming of martensite.

14. The seat height adjustment device of claim 13, wherein the reinforced region is given a profile by reshaping its cross-section, in particular, into an H, a U, a T, or a Z shape.

15. The seat height adjustment device of claim 13, wherein the toothed gear rack is designed as a one-piece, hot forged sheet metal part.

16. The seat height adjustment device of claim 13, wherein the central, reinforced region is bent.

17. The seat height adjustment device of claim 13, wherein the actuating device is an electric motor or a manual actuating device.

* * * * *